(12) United States Patent
Brewer et al.

(10) Patent No.: US 6,922,785 B1
(45) Date of Patent: *Jul. 26, 2005

(54) APPARATUS AND A METHOD FOR SECURE COMMUNICATIONS FOR NETWORK COMPUTERS

(75) Inventors: James Arthur Brewer, Leander, TX (US); Sanjay Gupta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,499

(22) Filed: May 11, 2000

(51) Int. Cl.[7] .................................................. H04L 9/00
(52) U.S. Cl. ................... 713/201; 713/176; 713/202; 380/28; 380/21; 380/47; 340/825.07; 340/824
(58) Field of Search .................. 713/153, 192, 713/200–202, 151, 154, 176, 161; 380/28, 21, 47, 1–2; 340/825.07, 824, 824.04; 710/15, 52

(56) References Cited

U.S. PATENT DOCUMENTS 5,070,528 A * 12/1991 Hawe et al. ............... 713/161
5,199,069 A * 3/1993 Barrett et al. ............... 380/28
6,141,705 A * 10/2000 Anand et al. ................ 710/15
6,304,973 B1 * 10/2001 Williams ..................... 713/201
6,557,102 B1 * 4/2003 Wong et al. ................. 713/176

* cited by examiner

*Primary Examiner*—Charles Rones
*Assistant Examiner*—Belix M. Ortiz
(74) *Attorney, Agent, or Firm*—Duke W. Yee; Joscelyn G. Cockburn; Stephen J. Walder, Jr.

(57) ABSTRACT

Encryption hardware built on a network interface card is provided by the present invention for encrypting data sent from a computer to a network. A block of data is retrieved from the network interface card, encrypted using encryption hardware, and inserted into a data packet. A flag is set in the packet header to indicate the encryption type. If the data packet is received by a system equipped with similar network interface card, decryption algorithm indicated by the flag is applied to the data using decryption hardware on the network interface card. The decrypted data is sent to re-assembly logic to rebuild the original message for the transmitted packets. The original message is sent to a computer memory via a system bus for further processing. If the data packet is received by a system not equipped with the network interface card, suitable software is provided to decrypt the data packet.

18 Claims, 3 Drawing Sheets

APPARATUS AND A METHOD FOR SECURE COMMUNICATIONS FOR NETWORK COMPUTERS

BACKGROUND OF THE INVENTION

1. Technical Field

The present invention relates generally to an improved network communications and in particular to an apparatus and a method to improve communications security. Still more particularly, the present invention provides an apparatus and a method for using encryption hardware on a network interface card to insure message security.

2. Description of the Related Art

Secure data communication is essential in a wide range of businesses, including, but not limited to, banking, e-commerce, on-line stock trading, business-to-business transactions, and so forth. In the process of carrying out a transaction, the user will enter a "secure server" and later leave a secure server. If this is performed in a web browser, then a small icon, such as a key or a lock, will appear when data is being encrypted. This continual entering and leaving a secure environment can be, at best, annoying and, at worst, nonexistent at some web sites.

There are a variety of data encryption techniques that may be used to secure data transfers. Data Encryption Standard (DES) is based on use of a symmetric private key with the level of security varying according to key length, typical lengths ranging from 56-bit DES to 256-bit DES.

Public key cryptography, also called the RSA method, named after the inventors Rivest, Shamir, and Adleman, uses an asymmetrical key pair in which one key is public and the other key is private. Data is typically encrypted by using the recipient's public key, and can only be decrypted by using the recipient's private key. The roles of the two keys can also be reversed, such as digitally signing a document using the sender's private key, and validating the signature using the sender's public key.

RSA is very computation intensive, thus it is often used to create a digital envelope, which holds an RSA-encrypted DES key and DES-encrypted data. This method encrypts the secret DES key so that it can be transmitted over the network, but encrypts and decrypts the actual message using the much faster DES algorithm.

The OSI (Open System Interconnection) Model for networks specifies seven layers: Layer 7: Application; Layer 6: Presentation; Layer 5: Session; Layer 4 Transport; Layer 3: Network; Layer 2: Data Link, and Layer 1: Physical. Data encryption is normally performed at Layer 6 using encryption software that requires considerable processor resources.

Therefore, it would be advantageous to have an apparatus and a method that performs encryption at all times in a manner transparent to the user and performs encryption in hardware at the network interface card level that does not require valuable processor resources.

SUMMARY OF THE INVENTION

An apparatus and a method in a distributed data processing system are provided for encrypting all data being sent from a computer to a network by using encryption hardware built on a network interface card. A block of data is retrieved from segmentation logic on a network interface card, encrypted using encryption hardware, and then inserted into a data packet. A flag is set in a packet header to indicated the type of encryption before the packet is transmitted to the network.

When the packet is received at a data processing system equipped in a similar manner as the sending data processing system, the decryption algorithm indicated by the flag in the packet header is applied to the data using decryption hardware built on the network interface card. The decrypted data is then sent to re-assembly logic for rebuilding the original message from the transmitted packets. Once the message is rebuilt, it is sent to a computer memory via a system bus for further processing. If the receiving data processing system is not equipped with a similar network interface card, it is still possible to decrypt the message if suitable software is provided.

By using encryption and decryption hardware built-on the network interface card, the central processor of a data processing system is freed from the responsibility of performing encryption and decryption and can carry out other computational tasks in a timely manner.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
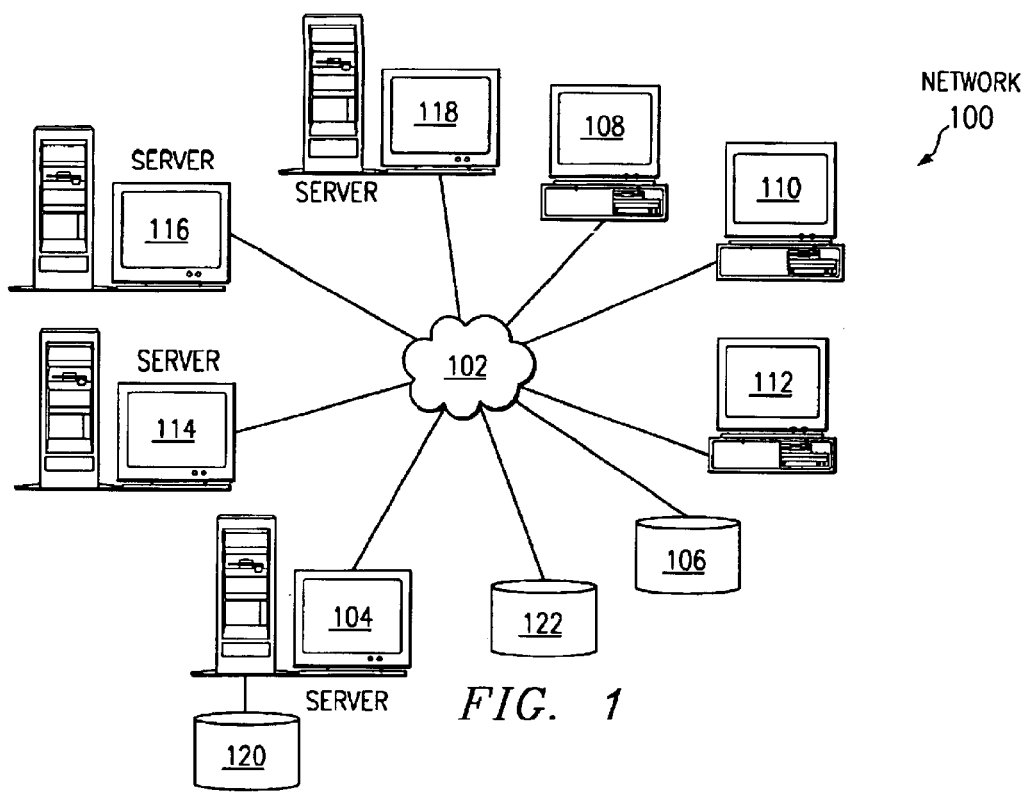
FIG. 1 depicts an exemplary distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

Encryption of sensitive data is vitally important for widespread acceptance of networked computers to perform everyday functions, particularly in the business and government sectors. For example, a user of client device 108 may decide to purchase a product sold by vendor 104. Clearly, credit card numbers and other items associated with the purchase need to be encrypted. But just encrypting a few items does not protect a user's privacy. Rather, it is much preferred that all traffic on the network be encrypted so that total privacy and security can be insured. The present invention provides this level of security support.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network. FIG. 1 is intended as an example and not as an architectural limitation for the processes of the present invention.

Figure 2:
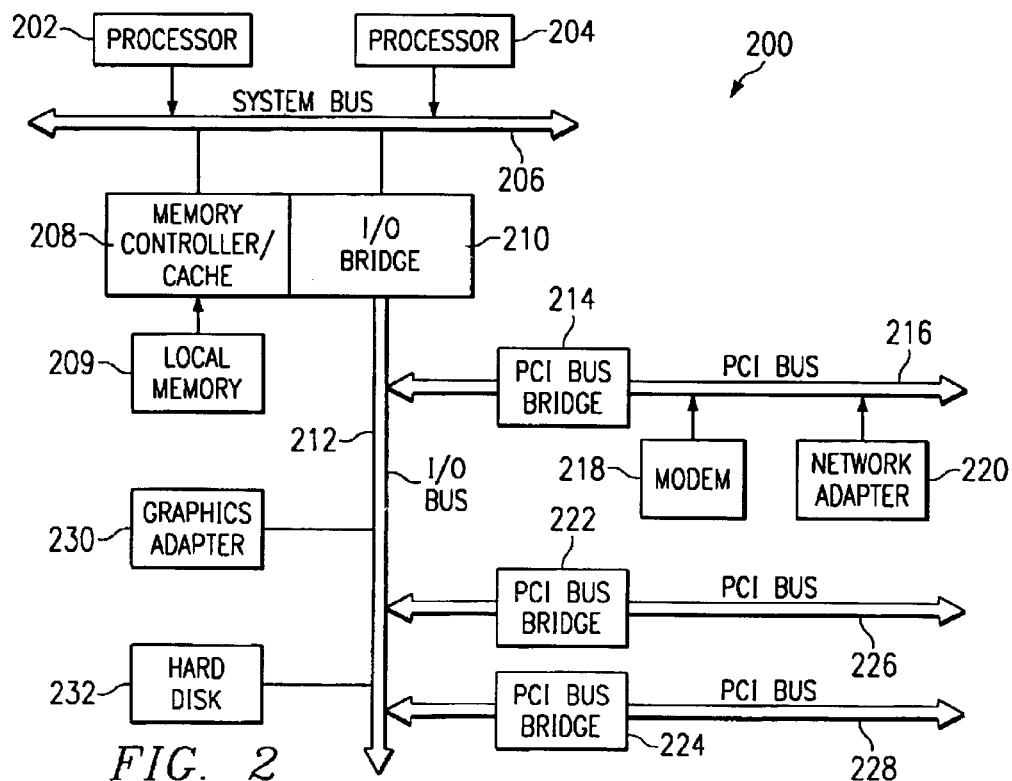
FIG. 2 shows an exemplary block diagram of a data processing system which may be used as a server or client.

FIG. 2 is a block diagram of a data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards. The present invention involves modifications to network adapter 220 so that encryption of data is performed in hardware located on this adapter card and in a manner that insures all outgoing data is encrypted.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
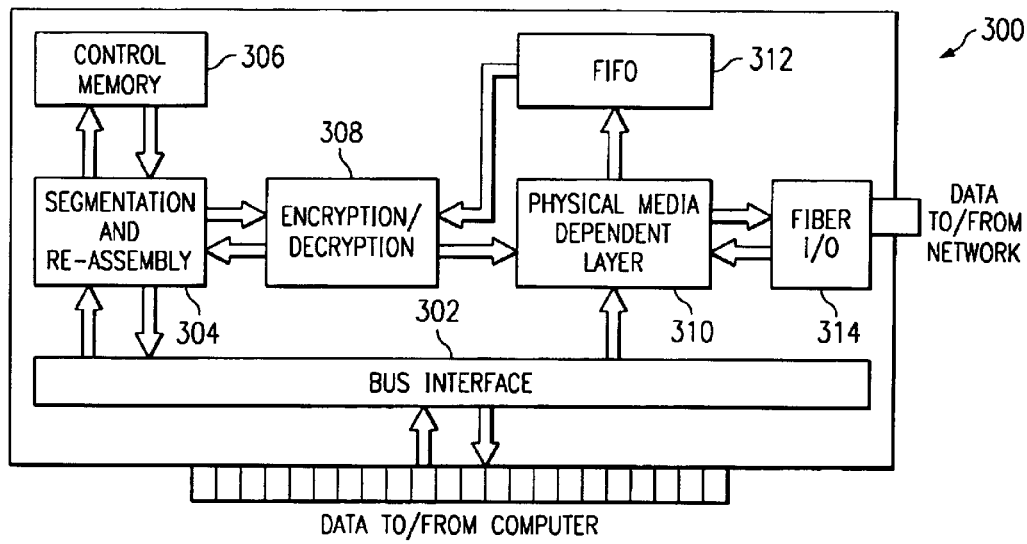
FIG. 3 presents an exemplary block diagram for a network interface card in accordance with a preferred embodiment of the invention.

Referring now to FIG. 3, a block diagram for a network interface card is shown. This card plugs into the data processing system bus and data is transferred using bus interface 302. PCI (Peripheral Component Interconnect) is a peripheral bus commonly used in PCs, Macintoshes and workstations. However, as one of ordinary skill in the art will appreciate, other bus structures, such as PC Card bus, NuBus, micro channel, VMEbus, and MULTIBUS, are possible. The bus provides a mechanism to move data between the computer memory and the network interface card. The most commonly used techniques are direct memory access, I/O transfer, and shared memory.

If data is being transferred to the network, it must be segmented into packets and these packets are sent individually to the destination. Data received from the network is in the form of packets that must be reassembled into the original message. Segmentation and Re-assembly logic 304 performs these tasks with the help of control memory 306. Associated encryption/decryption logic 308 either encrypts outgoing data or decrypts incoming data, as indicated by an encryption flag in the message header. This logic may contain a variety of commonly used encryption algorithms, such as DES (Data Encryption Standard) or the public key RSA algorithm. When packets are being reassembled, there is no guarantee that they arrive at the destination in the same sequence as they are sent.

Some common network protocols are ethernet and token ring. Every network interface card contains hardware specific to a particular protocol in the form of Physical Media Dependent Layer 310. Often it is necessary to buffer data and this is performed by First In First Out (FIFO) buffer 312.

Finally, the network card must connect to the network itself and this task is performed by Fiber I/O 314. The name "Fiber" is suggestive of one particular network media, optical fiber, that is popular today due to its high speed. But, as one of ordinary skill in the art will appreciate, other media, such as twisted pair and coaxial cable, are possible and that the transport media can vary as a packet of data traverses the network.

In a preferred embodiment of this invention, both the sending and receiving machine are equipped with a network interface card (NIC) that contains logic for encryption and decryption. However, if one of the machines does not contain a similar NIC, the encryption or decryption task at one site could be performed in software, assuming the machine has appropriate software installed.

Figure 4:
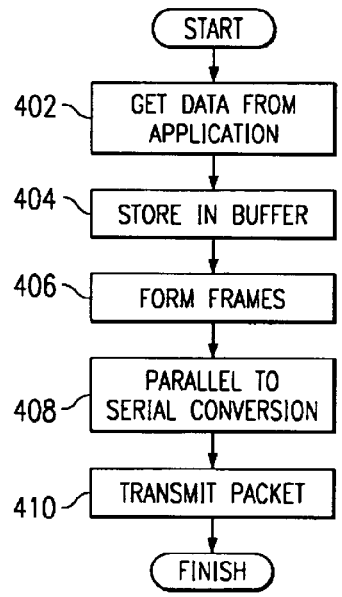
FIG. 4 presents an exemplary flowchart that describes the manipulation of data as it is sent from the computer to the network in accordance with a preferred embodiment of the invention.

With reference now to FIG. 4, a flowchart is given that describes the manipulation of data as it is transferred from the computer to the network using the network interface card. The data is transferred to the network interface card from memory via the system bus (step 402). This data is stored in a buffer (step 404) for processing. Data is transmitted over a network in packets or frames, so it is necessary to divide up the data into individual frames (step 406). The details of forming the frames, including any data encryption, will be discussed in FIG. 8. The data in a frame is a sequence of bytes where the bits in each byte are available in parallel. It is necessary to convert data in this bit-parallel format into a sequence of serial bits (step 408). The packet of bit-serial data is then transmitted using the available media (step 410).

Figure 5:
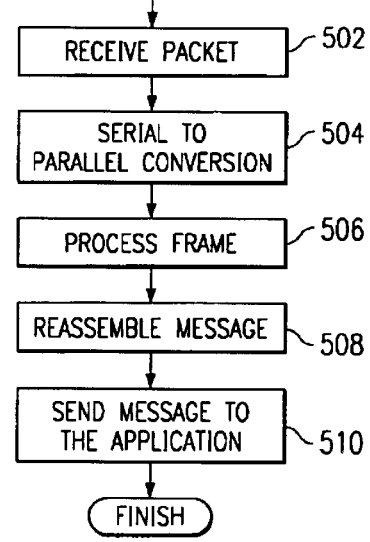
FIG. 5 presents an exemplary flowchart that describes the manipulation of data as it is received from the network to the computer in accordance with a preferred embodiment of the invention.

With reference now to FIG. 5, a flowchart is given that describes the manipulation of data as it is transferred from the network to the computer using the network interface card. The packet is received on the network media (step 502) and converted from bit-serial to bit-parallel format (step 504). Each frame of data is processed (step 506) to insure its validity or to provide decryption, if appropriate. This step will be expanded in FIG. 7 below. The sequence of frames have time stamp data that allow them to be reassembled in the correct order (step 508) in the event that frames arrive out of order. Once the entire message has been reassembled, it is sent to the application program (step 510).

Figure 6:
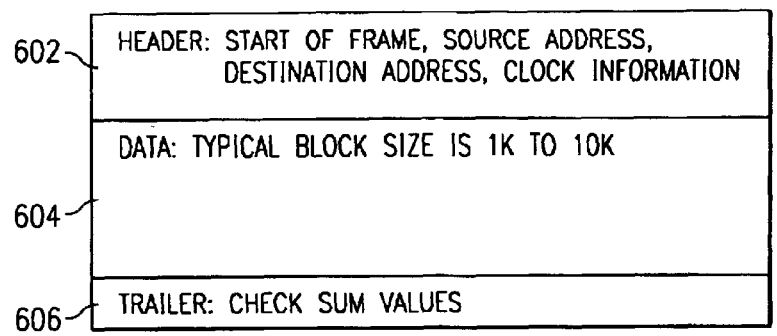
FIG. 6 shows the exemplary contents of a single frame of data in accordance with a preferred embodiment of the invention.

With reference now to FIG. 6, the contents of a single frame of data is shown. Frame header 602 starts with a unique code sequence that indicates the start of a frame. This is followed by the source address, the destination address, and clock information. The clock information is used to reassemble the packets when they arrive at the destination. The header information might include additional information regarding packet routing, a byte count, and a message type field (which may be used to indicate an encryption method).

The size of data block 604 is system dependent but is typically in the range of 1K bytes to 10K bytes. For example, ethernet has a data block size of 1500 bytes. It is the message in the data block that needs to be encrypted to guard against unwanted interception of information.

Message trailer 606 contains check sum values that are used on the receiving end to check the validity of the message. A simple scheme is to Exclusive-OR all the data in the message into a single byte. If the byte received does not agree with the check sum of the data block, then the packet is rejected and a retransmission is requested. As one of ordinary skill in the art will appreciate, alternative frame structures and validation techniques are possible. Some schemes use variable sized frames while others use fixed size frames.

Figure 7:
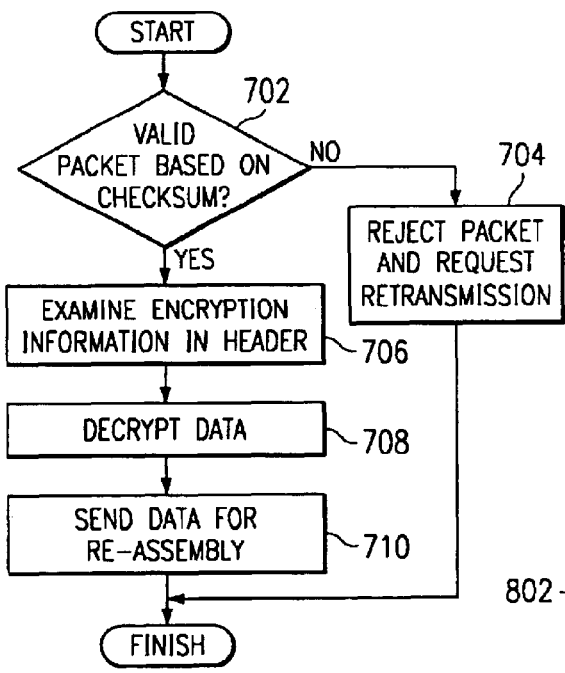
FIG. 7 presents an exemplary flowchart showing the decryption of an incoming message in accordance with a preferred embodiment of the invention.

With reference now to FIG. 7, a flowchart shows the decryption of an incoming message that has been encrypted. This is an expansion of step 506 in FIG. 5. First the checksum for the encrypted message has to be validated. If the checksum is not valid (step 702: No), then the packet is rejected and a retransmission is requested (step 704). If the checksum is valid (step 702: Yes), then the header block is examined to find the encryption scheme (step 706). The data block is decrypted using the specified scheme (step 708). The data is then sent for re-assembly (step 710).

Figure 8:
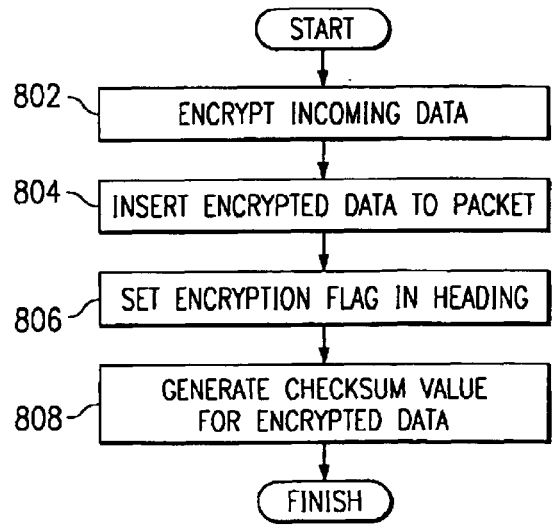
FIG. 8 presents an exemplary flowchart showing the encryption of an outgoing message in accordance with a preferred embodiment of the invention.

With reference now to FIG. 8, a flowchart shows the encryption of an outgoing message that is to be transmitted on the network. This is an expansion of step 406 in FIG. 4. The incoming block of data is encrypted (step 802). The data is inserted into the message packet (step 804) and message type flags are set in the message header to indicate the type of encryption (step 806). The checksum for the encrypted data is calculated and inserted at the end of the data packet (step 808).

It should be noted that the encryption scheme in this invention is always "turned on", meaning that all messages sent on the network will be encrypted whether they contain sensitive information or not. This has the advantage of insuring the security of all information transmitted on the network whether encryption was purposely turned on or not. Since the encryption and decryption is performed at the hardware level on the network interface card, valuable processor time is not used to obtain this basic level of security.

This invention can be used in tandem with traditional encryption/decryption that occurs at the presentation layer of the OSI model. For example, suppose a message 1 is encrypted at the presentation level using technique A to produce message 2. Message 2 is sent to the network information card and encrypted a second time using technique B to form message 3 in the form of a sequence of packets. At the recipient computer the data in the packets composing message 3 is decrypted using technique B and reassembled to form message 2. Message 2 is sent to the presentation level software where it is decrypted using technique A to form message 1, the original message.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a distributed data processing system for implementing secure network communication, the method comprising the data processing system implemented steps of:

receiving a block of data from a segmentation logic on a network interface card;

encrypting the block of data using encryption hardware built on the network interface card;

putting the encrypted data into a packet frame;

setting a flag in a header of the packet frame indicating an encryption algorithm, from a plurality of encryption algorithms, used to encrypt the block of data;

inserting a validation value for the encrypted data in a trailer of the packet frame; and sending the packet over a network.

2. The method of claim 1, wherein the encryption hardware on the network interface card does not use a main central processing unit for a computer.

3. A method in a distributed data processing system for implementing secure network communication, the method comprising the data processing system implemented steps of:

receiving a block of data from a packet frame on a network interface card;

validating the data based on a validation value in a trailer of the packet frame;

detecting an encryption algorithm used to encrypt the block of data based on a flag in a header of the packet frame;

decrypting the block of data in decryption hardware built on the network interface card using the detected encryption algorithm; and sending the decrypted data to a reassembly logic on the network interface card.

4. The method of claim 3, wherein the decryption hardware on the network interface card does not use a main central processing unit for a computer.

5. A data processing system for implementing secure network communication, the data processing system comprising:

a receiving means for receiving a block of data from a segmentation logic on a network interface card;

an encrypting means for encrypting the block of data using encryption hardware built on the network interface card;

a transfer means for transferring the encrypted data into a packet frame;

a flagging means for setting a flag in a header of the packet frame indicating an encryption algorithm, from a plurality of encryption algorithms, used to encrypt the block of data;

an inserting means for inserting a validation value for the encrypted data in a trailer of the packet frame; and a sending means for sending the packet over a network.

6. The data processing system of claim 5, wherein the encryption hardware on the network interface card does not use a main central processing unit for a computer.

7. A data processing system for implementing secure network communication, the data processing system comprising:

a receiving means for receiving a block of data from a packet fame on a network interface card;

a validating means for validating the data based on a validation value in a trailer of the packet frame;

a detecting means for detecting an encryption algorithm used to encrypt the block of data based on a flag in a header of the packet frame;

a decrypting means for decrypting the block of data in decryption hardware built on the network interface card using the detected encryption algorithm; and a sending means for sending the decrypted data to a re-assembly logic on the network interface card.

8. The data processing system of claim 7, wherein the decryption hardware on the network interface card does not use a main central processing unit for a computer.

9. A computer program product for implementing secure network communication, the computer program product comprising:

instructions for receiving a block of data from a segmentation logic on a network interface card;

instructions for encrypting the block of data using encryption hardware built on the network interface card;

instructions for putting the encrypted data into a packet frame;

instructions for setting a flag in a header of the packet frame indicating an encryption algorithm, from a plurality of encryption algorithms, used to encrypt the block of data;

instructions for inserting a validation value for the encrypted data in a trailer of the packet frame; and instructions for sending the packet over a network.

10. The computer program product of claim 9, wherein the instructions for encryption on the network interface card does not use a main central processing unit for a computer.

11. A computer program product for implementing secure network communication, the computer program product comprising:

instructions for receiving a block of data from a packet frame on a network interface card;

instructions for validating the data based on a validation value in a trailer of the packet frame;

instructions for detecting an encryption algorithm used to encrypt the block of data based on a flag in a header of the packet frame;

instructions for decrypting the block of data in decryption hardware built on the network interface card using the detected encryption algorithm; and instructions for sending the decrypted data to a re-assembly logic on the network interface card.

12. The computer program product of claim 9, wherein the instructions for decryption on the network interface card does not use a main central processing unit for a computer.

13. The method of claim 1, wherein the plurality of encryption algorithms includes Data Encryption Standard (DES) and Public Key Cryptography (RSA).

14. The method of claim 3, wherein the detected encryption algorithm includes one of Data Encryption Standard (DES) and Public Key Cryptography (RSA).

15. The data processing system of claim 5, wherein the plurality of encryption algorithms includes Data Encryption Standard (DES) and Public Key Cryptography (RSA).

16. The data processing system of claim 7, wherein the detected encryption algorithm includes one of Data Encryption Standard (DES) and Public Key Cryptography (RSA).

17. The computer program product of claim 9, wherein the plurality of encryption algorithms includes Data Encryption Standard (DES) and Public Key Cryptography (RSA).

18. The computer program product of claim 11, wherein the detected encryption algorithm includes one of Data Encryption Standard (DES) and Public Key Cryptography (RSA).

* * * * *